(12) United States Patent
Oshima et al.

(10) Patent No.: US 11,927,742 B2
(45) Date of Patent: Mar. 12, 2024

(54) ILLUMINATION DEVICE HAVING WEDGE PRISMS AND DRIVING PORTION WITH MULTIPLE GEARS

(71) Applicant: Mitsubishi Electric Corporation, Tokyo (JP)

(72) Inventors: Ritsuya Oshima, Tokyo (JP); Masashige Suwa, Tokyo (JP); Akinori Heishi, Tokyo (JP); Muneharu Kuwata, Tokyo (JP); Kuniko Kojima, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 695 days.

(21) Appl. No.: 17/056,771

(22) PCT Filed: Jun. 4, 2018

(86) PCT No.: PCT/JP2018/021374
§ 371 (c)(1),
(2) Date: Nov. 19, 2020

(87) PCT Pub. No.: WO2019/234796
PCT Pub. Date: Dec. 12, 2019

(65) Prior Publication Data
US 2021/0263301 A1   Aug. 26, 2021

(51) Int. Cl.
*G02F 1/29*  (2006.01)
*B60Q 1/04*  (2006.01)
(Continued)

(52) U.S. Cl.
CPC .............. *G02B 26/10* (2013.01); *B60Q 1/04* (2013.01); *F21V 5/02* (2013.01); *G02F 1/29* (2013.01);
(Continued)

(58) Field of Classification Search
CPC ........ G02B 26/10; G02B 5/04; G02B 7/1805; G02B 19/0014; G02B 19/0047;
(Continued)

(56) References Cited

U.S. PATENT DOCUMENTS 4,698,498 A * 10/1987 Mahoney .............. G01S 7/4811
359/201.1
5,610,771 A * 3/1997 Sigler .................. G02B 26/002
359/554

(Continued)

FOREIGN PATENT DOCUMENTS

CN  2433509 Y  6/2001
CN  106249405 A * 12/2016 ........... G02B 26/121

(Continued)

OTHER PUBLICATIONS

Chinese Office Action dated Dec. 3, 2021, in corresponding Chinese Patent Application No. 201880093661.X.
Chinese Office Action dated Dec. 9, 2022 in counterpart Chinese Patent Application No. 201880093661.X (with machine-generated English translation), 19 pages.
Chinese Office Action dated Jun. 29, 2022, in corresponding Chinese Patent Application No. 201880093661.X.
(Continued)

*Primary Examiner* — Magda Cruz
(74) *Attorney, Agent, or Firm* — XSENSUS LLP

(57) ABSTRACT

An illumination device includes a light source, a pair of wedge prisms, and a driving portion. The pair of wedge prisms deflect incident light. The driving portion includes a gear and a gear, and causes the pair of wedge prisms to rotate about a rotation axis by using the gear and the gear. The pair of wedge prisms include a wedge prism held by a barrel and a wedge prism held by a barrel. The barrel is disposed inside the barrel. A gear whose center axis is the rotation axis is provided on an outer periphery of the barrel. A gear whose center axis is the rotation axis is provided on an inner periphery of the barrel. The gear is disposed on an outer
(Continued)

peripheral side of the gear and meshes with the gear. The gear is disposed on an inner peripheral side of the gear and meshes with the gear.

10 Claims, 5 Drawing Sheets

(51) Int. Cl.
*F21V 5/02* (2006.01)
*G02B 26/10* (2006.01)
*G03B 21/13* (2006.01)
*G03B 21/14* (2006.01)

(52) U.S. Cl.
CPC .............. *G03B 21/13* (2013.01); *G03B 21/14* (2013.01); *G03B 21/142* (2013.01)

(58) Field of Classification Search
CPC ...... G02B 26/0891; B60Q 1/04; B60Q 1/143; B60Q 1/10; B60Q 2300/45; F21V 5/02; G02F 1/29; G03B 21/13; G03B 21/14; G03B 21/142; G03B 21/147; F21S 43/14; F21S 43/26
See application file for complete search history.

(56) References Cited

U.S. PATENT DOCUMENTS

| | | | |
|---|---|---|---|
| 2009/0323203 A1 | 12/2009 | Adams et al. | |
| 2014/0123796 A1 | 5/2014 | Ishida et al. | |
| 2017/0160541 A1* | 6/2017 | Carothers | .............. G02B 17/08 |
| 2018/0095270 A1* | 4/2018 | Carothers | ............ G02B 26/108 |

FOREIGN PATENT DOCUMENTS

| | | |
|---|---|---|
| CN | 107614983 A | 1/2018 |
| JP | 5-165991 A | 7/1993 |
| JP | 2004-136307 A | 5/2004 |
| JP | 2006-106508 A | 4/2006 |
| JP | 2014-111983 A | 6/2014 |
| WO | 2013/179186 A1 | 12/2013 |

OTHER PUBLICATIONS

International Search Report and Written Opinion dated Aug. 21, 2018, received for PCT Application No. PCT/JP2018/021374 Filed on Jun. 4, 2018, 9 Pages including English translation of the Search Report.

* cited by examiner

ILLUMINATION DEVICE HAVING WEDGE PRISMS AND DRIVING PORTION WITH MULTIPLE GEARS

CROSS-REFERENCE TO RELATED APPLICATION

The present application is based on PCT filing PCT/JP2018/021374, filed Jun. 4, 2018, the entire contents of which are incorporated herein by reference.

TECHNICAL FIELD

The present invention relates to an illumination device.

BACKGROUND ART

Patent Reference 1 describes a beam deflector including a rotation mechanism 11 that causes two prisms 10 and 20 having the same apex angle to rotate about one rotation center line 30 at the same speed in opposite directions.

The prism 10 is integrally formed with an annular gear 11 having teeth on its outer side, and is rotatably supported by a bearing 12. The prism 20 is integrally formed with an annular gear 21 having teeth on its outer side, and is rotatably supported by a bearing 22. The gear 11 meshes with a driving gear 14 on a motor 13 side, and the gear 21 meshes with a driving gear 24 on a motor 23 side. These motors cause the prisms to rotate.

PRIOR ART REFERENCE

Patent Reference

Patent Reference 1: Japanese Patent Application Publication No. H05-165991 (paragraph 0011, FIG. 1)

SUMMARY OF THE INVENTION

Problem to be Solved by the Invention

However, in the beam deflector described in Patent Reference 1, the prisms 10 and 20 are respectively integrally formed with the annular gears 11 and 21 each having teeth on its outer side, and the motors 13 and 23 are respectively disposed outside the gears 11 and 21. Thus, it is difficult to reduce the size of the device.

The present invention can facilitate reduction in size of a device by rotating prisms by using a gear having internal teeth.

Means of Solving the Problem

An illumination device 100 includes a light source to emit light, a pair of wedge prisms to receive the light and deflect the received light, and a driving portion including a first gear and a second gear and causing the pair of wedge prisms to rotate about a first rotation axis of the pair of wedge prisms by using the first gear and the second gear. The pair of wedge prisms include a first wedge prism held by a first barrel and a second wedge prism held by a second barrel. The first barrel is disposed inside the second barrel. A third gear whose center axis is the first rotation axis is disposed on an outer periphery of the first barrel. A fourth gear whose center axis is the first rotation axis is disposed on an inner periphery of the second barrel. The first gear is disposed on an outer peripheral side of the third gear and meshes with the third gear. The second gear is disposed on an inner peripheral side of the fourth gear and meshes with the fourth gear.

Effects of the Invention

The reduction in size of the illumination device can be facilitated.

MODE FOR CARRYING OUT THE INVENTION

Figure 1:
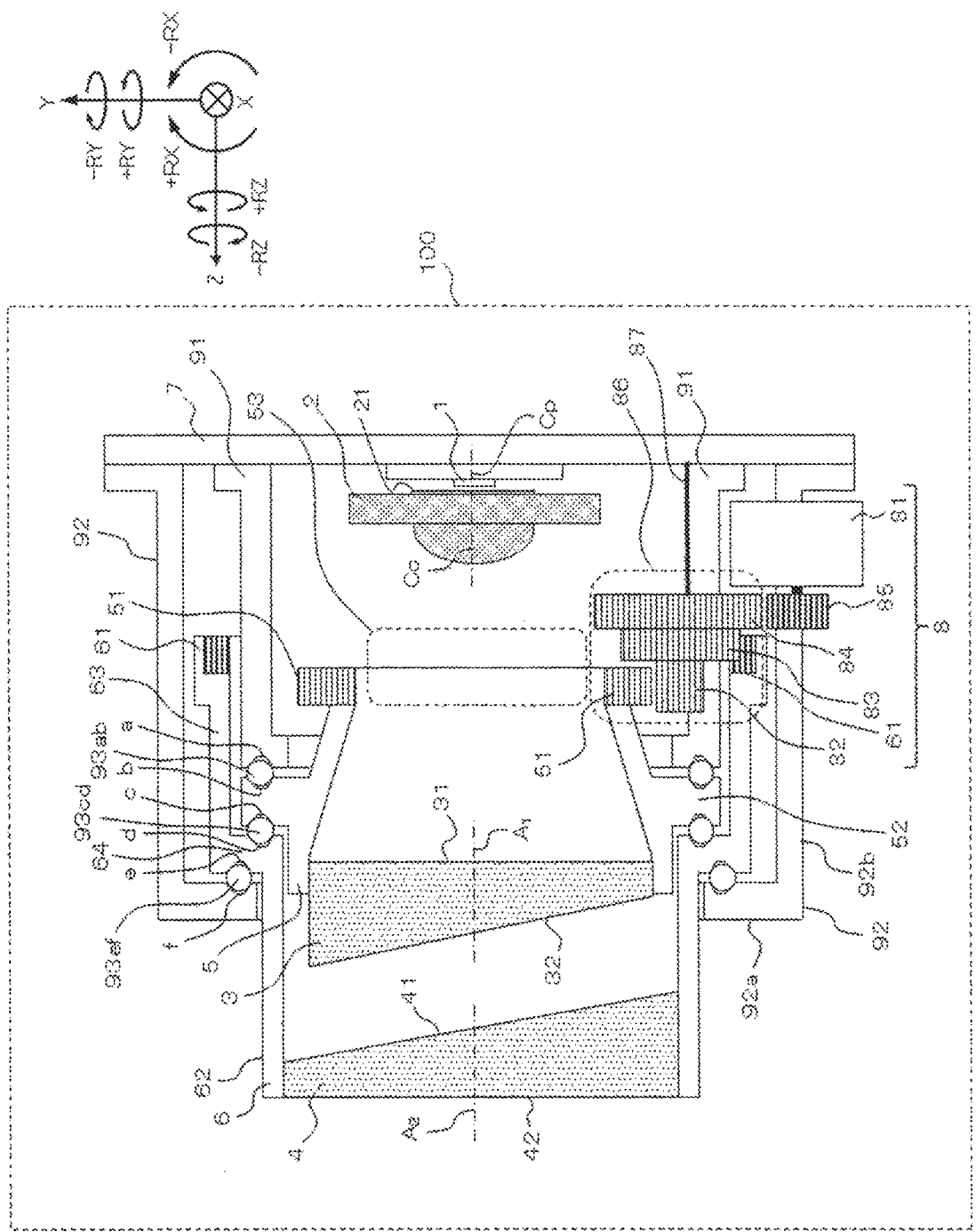
FIG. 1 is a configuration diagram of an illumination device 100 according to a first embodiment.
Figure 2:
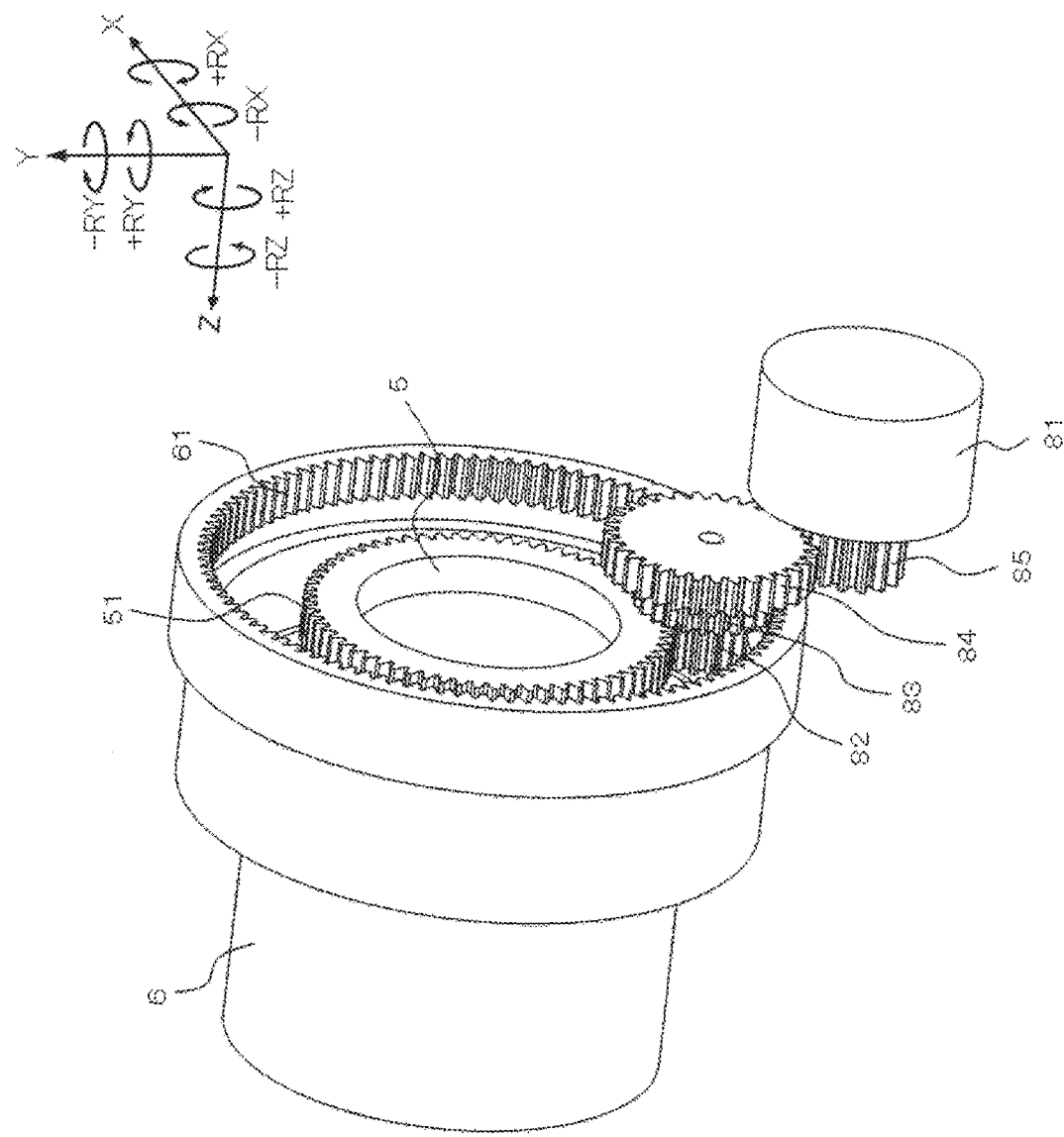
FIG. 2 is a perspective view of a portion including gears of the illumination device 100 according to the first embodiment.

The beam deflector described in Patent Reference 1 uses two motors for rotating two wedge prisms. Thus, it is difficult to reduce the size of the device.

According to the present invention, two wedge prisms are rotated by one motor, and thus reduction in size can be facilitated.

From the viewpoint of reducing environmental load, such as reducing emission of carbon dioxide ($CO_2$) and consumption of fuel, it is desired to save energy of illumination devices. Accordingly, downsizing, weight reduction, and power saving of the illumination devices are required. In view of this, as a light source for the illumination device, it is desired to employ a semiconductor light source exhibiting higher light emission efficiency than a conventional halogen bulb (lamp light source). The "semiconductor light source" is, for example, a light emitting diode (LED), a laser diode (LD), or the like.

Light sources such as an organic electroluminescent (organic EL) light source, and a light source using a phosphor are referred to as solid light sources. The light source using a phosphor is configured to, for example, irradiate the phosphor coated on a base material with excitation light so that the phosphor emits light. The semiconductor light source is one of the solid light sources.

There is known an illumination device in which light emitted from a light source is thrown frontward through two wedge prisms. When the wedge prisms are rotated about a rotation axis, the emission direction of light emitted from the wedge prism changes. Light emitted from the wedge prisms is irradiated onto a circular area on an irradiation surface.

For example, the illumination device can employ the following configuration. The illumination device scans a light beam having a large diameter to change the irradiation direction. The illumination device is, for example, a spotlight in a case where an irradiation target moves. A light source of the illumination device is, for example, an LED.

For example, a display device can employ the following configuration. The display device forms an image or displays information by scanning with a light ray having a small diameter, such as laser light.

For example, a projection device can employ the following configuration. The projection device includes an image display device on a light path. The projection device projects an image or the like displayed by the image display device. The image display device is, for example, a diaphragm plate having a shape of a symbol or the like, a liquid crystal panel, or the like. Accordingly, the projection device is capable of moving a projected image of the symbol, the image or the like. The projection device is capable of projecting image information on a road surface, a passage or the like to attract attention, to guide a passenger, or to perform other functions. The image display device is an image display portion.

For example, a vehicle light can employ the following configuration. The vehicle light is, for example, a high beam headlight for an automobile or the like. The high beam headlight is a headlight that is used during traveling. An illumination distance of the high beam headlight is, for example, 100 m. For example, in order to illuminate a pedestrian in front of the vehicle during traveling, the high beam headlight moves an irradiation position in accordance with the pedestrian.

A light irradiation device 100 serves as a vehicle light and can be used as a low beam headlight of an automobile or the like. The low beam headlight is a headlight that is used when the vehicle passes by an oncoming car. An illumination distance of the low beam headlight is, for example, 30 m. For example, the light irradiation device 100 scans an irradiation position at high speed to thereby achieve light distribution required for the low beam headlight.

The light irradiation device 100 serves as a vehicle light and can be used as a light distribution variable headlight system of an automobile or the like. The light distribution variable headlight system is, for example, an adaptive driving beam (ADB). In order not to dazzle a forward vehicle by a high beam during traveling, the ADB turns off only irradiation on an area that dazzles the front vehicle. The ADB irradiates the other areas with the high beam to secure visibility and enhance safety.

In the following embodiment, XYZ rectangular coordinates are shown in the figures in order to facilitate description.

In the following description, the frontward direction of the illumination device 100 is referred to as a +Z-axis direction, and the rearward direction of the illumination device 100 is referred to as a −Z-axis direction. The frontward direction of the illumination device 100 is a direction in which illumination light is emitted. The upward direction of the illumination device 100 illustrated in the figure is referred to as a +Y-axis direction, and the downward direction of the illumination device 100 is referred to as a −Y-axis direction. As one faces the frontward direction with respect to the illumination device 100 (in the +Z-axis direction), the rightward direction of the illumination device 100 is referred to as a +X-axis direction, and the leftward direction of the illumination device 100 is referred to as a −X-axis direction.

In the following embodiment, light from a light source 1 is emitted in the +Z-axis direction, for example.

When one faces the front (+Z-axis direction side) of the illumination device 100 from the rear (−Z-axis direction side) of the illumination device 100, a clockwise direction about the Z axis is referred to as a +RZ direction, and a counterclockwise direction about the Z axis is referred to as a −RZ direction. When one faces the right (+X-axis direction side) of the illumination device 100 from the left (−X-axis direction side) of the illumination device 100, a clockwise direction about the X axis is referred to as a +RX direction, and a counterclockwise direction about the X axis is referred to as a −RX direction. When one faces the top (+Y-axis direction side) of the illumination device 100 from the bottom (−Y-axis direction side) of the illumination device 100, a clockwise direction about the Y axis is referred to as a +RY direction, and a counterclockwise direction about the Y axis is referred to as a −RY direction.

As described above, the illumination device 100 described in the embodiment can be used as a display device, a projection device, or a vehicle light. As one example, the device of the embodiment will be described as an illumination device.

FIRST EMBODIMENT

FIG. 1 is a configuration diagram illustrating a configuration of an illumination device 100 according to a first embodiment.

[Configuration of Illumination device 100]

The illumination device 100 includes a light source 1, a wedge prism 3, a wedge prism 4, a barrel 5, a barrel 6, and a driving portion 8. The illumination device 100 can include a light collection optical system 2, a base member 7, a retention member 91, or a cover member 92.

(Light Source 1)

The light source 1 emits light. The light source 1 emits, for example, light having a divergence angle. The light source 1 is, for example, a solid light source. In the following description, the light source 1 will be described as an LED.

An optical axis Cp is an optical axis of the light source 1. The optical axis Cp of the light source 1 is, for example, an axis passing through the center of a light emission surface of the light source 1 and being perpendicular to the light emission surface. The optical axis Cp of the light source 1 is, for example, a main optical axis. The main optical axis is an optical center axis of light emitted from the light source, and is generally in an emission direction in which the luminous intensity is maximum.

(Light Collection Optical System 2)

The light collection optical system 2 collects light emitted from the light source 1. The light collection optical system 2 is, for example, a lens. The light collection optical system 2 changes a divergence angle of light emitted from the light source 1. The light collection optical system 2 reduces the divergence angle of incident light. In the case where an LED having a large divergence angle is used as the light source 1, the light collection optical system 2 can efficiently collect light. Thus, the size of the illumination device 100 can be reduced.

An optical axis Cc is an optical axis of the light collection optical system 2. The optical axis Cc of the light collection optical system 2 and the optical axis Cp of the light source 1 are, for example, the same axis. The direction of each of the optical axes Cp and Cc can be changed by using, for example, a mirror or the like. The positional relationships with respect to the direction of each of the optical axes Cp and Cc are indicated while the optical axes Cp and Cc are regarded as straight lines. The same applies to the other optical axes.

(Wedge Prisms 3 and 4)

The wedge prisms 3 and 4 deflect incident light. The pair of wedge prisms 3 and 4 receive light. The pair of wedge prisms 3 and 4 then reflect the received light. The wedge prism 3 is located on the light source 1 side with respect to the wedge prism 4 on the optical axis Cp of the light source 1.

The wedge prism 3 receives light emitted from the light source 1. Light emitted from the light source 1 is incident on the wedge prism 3. The wedge prism 3 receives, for example, light emitted from the light collection optical system 2. Light emitted from the light collection optical system 2 is incident on the wedge prism 3.

Light emitted from the wedge prism 3 is refracted in accordance with a wedge angle of the wedge prism 3. The light emitted from the wedge prism 3 is incident on the wedge prism 4.

The wedge prism 4 receives light emitted from the wedge prism 3. Light emitted from the wedge prism 3 is incident on the wedge prism 4. The light emitted from the wedge prism 4 is refracted in accordance with a wedge angle of the wedge prism 4.

A wedge prism is a prism having an emission surface which is tilted with respect to an incident surface. The wedge prism includes a tilted optical surface. One surface of the wedge prism is tilted at a small angle with respect to the other surface. A tilt angle of one surface with respect to the other surface of the wedge prism is referred to as a wedge angle or an apex angle.

Light incident on the wedge prism is refracted at an angle in accordance with the tilt angle of the emission surface of the wedge prism and is emitted. Light incident on the wedge prism is refracted in a direction toward a side in which the prism has a larger thickness. Light incident on the wedge prism is deflected in a direction toward a side in which the prism has a larger thickness. An angle of light emitted from the wedge prism with respect to light incident on the wedge prism is referred to as a deflection angle.

In the following embodiment, one surface of the wedge prism is a surface perpendicular to a rotation axis. Alternatively, two surfaces of the wedge prism may be surfaces tilted with respect to the rotation axis. That is, an incidence surface and an emission surface of the wedge prism may be surfaces tilted with respect to the rotation axis.

By using two wedge prisms, these prisms function as an anamorphic prism. With this configuration, an oval laser beam can be corrected to a circular shape.

The two wedge prisms 3 and 4 rotate about a rotation axis A of the wedge prisms 3 and 4. Accordingly, the direction of light emitted from the wedge prism 4 changes. A rotation axis $A_1$ is a rotation axis of the wedge prism 3. A rotation axis $A_2$ is a rotation axis of the wedge prism 4. The rotation axis $A_1$ and the rotation axis $A_2$ are, for example, the same axis. The same axis as the rotation axis $A_1$ and the rotation axis $A_2$ is the rotation axis A.

The rotation axis A of the wedge prisms 3 and 4 and the optical axis Cp of the light source 1 are, for example, the same axis. The rotation axis A of the wedge prisms 3 and 4 and the optical axis Cc of the light collection optical system 2 are, for example, the same axis.

When the wedge prisms 3 and 4 are rotated in opposite directions by the same angle, light emitted from the wedge prism 4 moves along a straight line. That is, light emitted from the wedge prism 4 linearly moves in a direction perpendicular to the rotation axis A.

The wedge prism 3 is held by the barrel 5. The wedge prism 4 is held by the barrel 6.

(Barrel 5)

The barrel 5 is, for example, disposed inside the barrel 6.

The barrel 5 holds the wedge prism 3. The wedge prism 3 is held by the barrel 5. The wedge prism 3 is held on, for example, the +Z-axis direction side of the barrel 5. The wedge prism 3 is held at, for example, an end on the +Z-axis direction side of the barrel 5. The wedge prism 3 is held at an end on the light emission side of the barrel 5 in the direction of the optical axis Cp.

The barrel 5 is provided with a gear 51. The barrel 5 includes the gear 51. The gear 51 has the rotation axis $A_1$ as an axis. The axis of the gear 51 is the rotation axis $A_1$.

The gear 51 meshes with a gear 82. The gear 51 is formed at an end on the light source 1 side of the barrel 5. The gear 51 is formed at, for example, an end on the −Z-axis direction side of the barrel 5. The gear 51 is formed at, for example, an end on the light source 1 side of the barrel 5 in the direction of the optical axis Cp.

The gear 51 is provided on an outer peripheral side of the barrel 5. The gear 51 is provided on an outer periphery of the barrel 5. The gear 51 whose axis is the rotation axis $A_1$ is provided on the outer periphery of the barrel 5. The gear 51 whose axis is the rotation axis $A_1$ of the wedge prism 3 is provided on the outer periphery of the barrel 5. The tooth tips of the gear 51 face the outside of the barrel 5.

The size in the radial direction of a portion of the barrel 5 on which the gear 51 is formed is smaller than the size in the radial direction of a portion of the barrel 5 on which the wedge prism 3 is provided. The size in the radial direction on the inner peripheral side of the portion of the barrel 5 on which the gear 51 is formed is smaller than the size in the radial direction on the inner peripheral side of the portion of the barrel 5 on which the wedge prism 3 is provided. The size in the radial direction of an incident opening 53 is smaller than the size in the radial direction on the inner peripheral side of the portion of the barrel 5 on which the wedge prism 3 is provided.

The barrel 5 includes, for example, a projection 52. The barrel 5 includes, for example, the projection 52 on an outer surface of a side surface. In the Z-axis direction, the projection 52 is disposed between the wedge prism 3 and the gear 51. In the direction of the rotation axis $A_1$, the projection 52 is disposed between the wedge prism 3 and the gear 51. The projection 52 has a ring shape. The ring shape of the projection 52 is a circular shape about the rotation axis $A_1$ of the wedge prism 3. The projection 52 has a circular shape about the rotation axis $A_1$ of the wedge prism 3.

The barrel 5 includes a groove b and a groove c described later. The groove b is formed on the −Z-axis direction side of the barrel 5. The groove c is formed on the +Z-axis direction side of the barrel 5. The grooves b and c are formed on, for example, the projection 52. The grooves b and c are formed on, for example, the ring-shaped projection 52. The groove b is formed on a surface on the −Z-axis direction side of the projection 52. The groove c is formed on a surface on the +Z-axis direction side of the projection 52.

Each of the grooves b and c has a ring shape. Each of the grooves b and c has a circular shape. The ring shape of each of the grooves b and c is a circular shape. Each of the grooves b and c has, for example, a circular shape about the rotation axis $A_1$ of the wedge prism 3. The rotation axis $A_1$ of the wedge prism 3 is, for example, parallel to the Z axis. Each of the grooves b and c is a continuous groove having a circular shape.

(Barrel 6)

The barrel 6 is, for example, disposed outside the barrel 5.

The barrel 6 holds the wedge prism 4. The wedge prism 4 is held by the barrel 6. The wedge prism 4 is held on, for example, the +Z-axis direction side of the barrel 6. The wedge prism 4 is held at, for example, an end on the +Z-axis direction side of the barrel 6. The wedge prism 4 is held at an end on the light emission side of the barrel 6 in the direction of the optical axis Cp.

A gear 61 is formed on the barrel 6. The barrel 6 includes the gear 61. The gear 61 has the rotation axis $A_2$ as an axis. The axis of the gear 61 is the rotation axis $A_2$.

The gear 61 meshes with a gear 83. The gear 61 is formed at an end on the light source 1 side of the barrel 6. The gear 61 is formed at, for example, an end on the −Z-axis direction side of the barrel 6. The gear 61 is formed at, for example, an end on the light source 1 side of the barrel 6 in the direction of the optical axis Cp.

The gear 61 is provided on an inner peripheral side of the barrel 6. The gear 61 is provided on an inner periphery of the barrel 6. The gear 61 whose axis is the rotation axis $A_2$ is provided on the inner periphery of the barrel 6. The gear 61 whose center axis is the rotation axis $A_2$ of the wedge prism 4 is provided on the inner periphery of the barrel 6. The tooth tips of the gear 61 face the inside of the barrel 6.

The size in the radial direction of a portion of the barrel 6 on which the gear 61 is formed is larger than the size in the radial direction of a portion of the barrel 6 on which the wedge prism 4 is provided. The size in the radial direction on the inner peripheral side of the portion of the barrel 6 on which the gear 61 is formed is larger than the size in the radial direction on the inner peripheral side of the portion of the barrel 6 on which the wedge prism 4 is provided.

The barrel 6 includes, for example, a cylinder portion 62, a cylinder portion 63, and a joint portion 64. The cylinder portion 62 is formed on, for example, the +Z-axis direction side of the barrel 6. The cylinder portion 63 is formed on, for example, the −Z-axis direction side of the barrel 6. The joint portion 64 is formed on, for example, the −Z-axis direction side of the cylinder portion 62. The joint portion 64 is formed on, for example, the +Z-axis direction side of the cylinder portion 63. In the Z-axis direction, the joint portion 64 is formed, for example, between the cylinder portion 62 and the cylinder portion 63. In the direction of the rotation axis $A_2$, the joint portion 64 is formed, for example, between the cylinder portion 62 and the cylinder portion 63.

The cylinder portion 62 holds the wedge prism 4. The wedge prism 4 is held on, for example, the +Z-axis direction side of the cylinder portion 62. The wedge prism 4 is held at, for example, an end on the +Z-axis direction side of the cylinder portion 62. The wedge prism 4 is held at, for example, an end on the light emission side of the cylinder portion 62 in the direction of the optical axis Cp.

A gear 61 is formed on the cylinder portion 63. The cylinder portion 63 includes the gear 61. The gear 61 is formed at, for example, an end on the −Z-axis direction side of the cylinder portion 63. The gear 61 is formed at, for example, an end on the light source 1 side of the cylinder portion 63 in the direction of the optical axis Cp.

The diameter of the cylinder portion 62 is smaller than the diameter of the cylinder portion 63. The diameter of a portion of the cylinder portion 62 holding the wedge prism 4 is smaller than the diameter of a portion of the cylinder portion 63 on which the gear 61 is formed. The diameter on the inner peripheral side of the portion of the cylinder portion 62 holding the wedge prism 4 is smaller than the diameter on the inner peripheral side of the portion of the cylinder portion 63 on which the gear 61 is formed. The size of the cylinder portion 62 in the radial direction is smaller than the size of the cylinder portion 63 in the radial direction. The size in the radial direction on the inner peripheral side of the cylinder portion 62 is smaller than the size in the radial direction on the inner peripheral side of the cylinder portion 63. The size in the radial direction of the portion of the cylinder portion 62 holding the wedge prism 4 is smaller than the size in the radial direction of the portion of the cylinder portion 63 on which the gear 61 is formed. The size in the radial direction on the inner peripheral side of the portion of the cylinder portion 62 holding the wedge prism 4 is smaller than the size in the radial direction on the inner peripheral side of the portion of the cylinder portion 63 on which the gear 61 is formed.

A center axis of the cylinder portion 62 coincides with a center axis of the cylinder portion 63. The center axes of the cylinder portions 62 and 63 coincide with the rotation axis $A_2$ of the wedge prism 4.

The joint portion 64 is a portion connecting the cylinder portion 62 and the cylinder portion 63. The joint portion 64 has a plate shape. The joint portion 64 has a ring shape. The joint portion 64 has a plate-like ring shape. The joint portion 64 is formed in parallel to, for example, a plane perpendicular to the Z axis. The joint portion 64 is formed in parallel to, for example, a plane perpendicular to the rotation axis $A_2$.

The barrel 6 includes a groove d and a groove e described later. The groove d is formed on the −Z-axis direction side of the barrel 6. The groove d is formed on, for example, a surface on the −Z-axis direction side of the joint portion 64. The surface on the −Z axis direction side of the joint portion 64 is an inner surface of the barrel 6. The groove e is formed on the +Z-axis direction side of the barrel 6. The groove e is formed on, for example, a surface on the +Z-axis direction side of the joint portion 64. The surface on the +Z-axis direction side of the joint portion 64 is an outer surface of the barrel 6.

Each of the grooves d and e has a ring shape. Each of the grooves d and e has a circular shape. The ring shape of each of the grooves e and e is a circular shape. Each of the grooves d and e has, for example, a circular shape about the rotation axis k of the wedge prism 4. The rotation axis A of the wedge prism 4 is, for example, parallel to the Z axis. Each of the grooves d and e is a continuous groove having a circular shaper.

Rolling members 93*cd* are disposed between the groove c and the groove d. The rolling members 93*cd* correspond to rolling elements of a rolling bearing. Each of the grooves c and d corresponds to a raceway surface of the rolling bearing.

The barrel 6 rotates with respect to the barrel 5 via the rolling members 93*cd*. The barrel 6 is held to rotate with respect to the barrel 5 via the rolling members 93*cd*. The barrel 6 rotates with respect to the barrel 5 about the rotation axis $A_2$ of the wedge prism 4. The barrel 6 is held to rotate with respect to the barrel 5 about the rotation axis $A_2$ of the wedge prism 4. The barrel 5 holds the barrel 6 so that the barrel 6 rotates about the rotation axis $A_1$ of the barrel 5.

Alternatively, the barrel 6 can rotate with respect to the barrel 5 via, for example, sliding surfaces without using the rolling members 93*cd*. That is, the barrel 6 can rotate with respect to the barrel 5 via a bearing structure. The barrel 6 is held to rotate with respect to the barrel 5 via the bearing structure.

The "bearing" is a component that contacts a rotating counterpart to receive a load and supports the counterpart. The bearing is, for example, a rolling bearing, a slide bearing, a magnetic bearing, a fluid bearing, or the like. The bearing structure is a structure that supports the counterpart.

(Base Member 7)

The base member 7 holds the light source 1. The base member 7 is capable of holding the light collection optical system 2, the retention member 91, or the cover member 92.

(Driving Portion 8)

The driving portion 8 includes the gear 82 and the gear 83. The driving portion 8 can include a motor 81, a gear 84, a gear 85, or a rotation shaft 87. For example, in FIG. 1, the gears 82, 83, and 84 are illustrated as intermediate gears 86.

The driving portion 8 includes the gear 82 and the gear 83. The driving portion 8 causes the pair of wedge prisms 3 and 4 to rotate about the rotation axis A by using the gear 82 and the gear 83. The rotation axis A is a rotation axis of the pair of wedge prisms 3 and 4.

The motor 81 rotates the barrels 5 and 6. The gear 85 is attached to, for example, a rotation axis of the motor 81. The gear 85 meshes with the gear 84.

The gear 84 is integrally formed with the gear 82, for example. The gear 82 meshes with the gear 51. The gear 82 is disposed on the outer peripheral side of the gear 51. The gear 51 is formed on the barrel 5.

The gear 84 is integrally formed with the gear 83, for example. The gear 83 meshes with the gear 61. The gear 83 is disposed on the inner peripheral side of the gear 61. The gear 61 is formed on the barrel 6.

In the first embodiment, the gear 82, the gear 83, and the gear 84 are integrally formed, for example. The intermediate gears 86 include the gear 82, the gear 83, and the gear 84 which are integrally formed. A rotation shaft of the intermediate gears 86 is the rotation shaft 87.

In order to facilitate description, the rotation shaft of the gear 82, the rotation shaft of the gear 83, and the rotation shaft of the gear 84 will be described as the rotation shaft 87. Alternatively, the rotation shaft of the gear 82, the rotation shaft of the gear 83, and the rotation shaft of the gear 84 may be different shafts.

The gear 82 causes the barrel 5 to rotate. The barrel 5 rotates about the rotation axis $A_1$. The gear 82 causes the barrel 5 to rotate about the rotation axis $A_1$.

The gear 83 causes the barrel 6 to rotate. The barrel 6 rotates about the rotation axis $A_2$. The gear 83 causes the barrel 6 to rotate about the rotation axis $A_2$.

The gear 82 and the gear 83 are disposed between the light source 1 and the wedge prism 3 in the direction of the optical axis Cp of the light source 1. The gear 82 and the gear 83 are disposed between the light collection optical system 2 and the wedge prism 3 in the direction of the optical axis Cc of the light collection optical system 2. The gear 82 and the gear 83 are disposed between the light collection optical system 2 and the wedge prism 3 in the direction of the optical axis Cc of the light collection optical system 2.

The gear 82 is disposed on the wedge prism 3 side with respect to the gear 83 in the direction of the rotation axis A. The gear 82 is disposed on the wedge prism 3 side with respect to the gear 83 in the direction of the rotation axis $A_1$. The gear 82 is disposed on the wedge prism 3 side with respect to the gear 83 in the direction of the optical axis Cp of the light source 1.

The gear 83 is disposed between the light source 1 and the barrel 5 in the direction of the optical axis Cp of the light source 1. The gear 83 is disposed between the light collection optical system 2 and the barrel 5 in the direction of the optical axis Cc of the light collection optical system 2. The gear 83 is disposed between the light source 1 and the barrel 5 in the direction of the rotation axis A.

The driving portion 8 includes one motor 81. The driving portion 8 includes the single motor 81. The motor 81 rotates the rotation shaft 87. The gear 82 and the gear 83 may be rotated independently from each other by two motors.

The gear 82 and the gear 83 may be rotated by other driving methods. Examples of the other driving methods include a worm gear, a friction gear, a belt, and the like.

The motor 81 is fixed to, for example, the base member 7. The motor 81 is fixed to, for example, the retention member 91. The motor 81 is fixed to, for example, the cover member 92. The motor 81 is, for example, a stepping motor. The motor 81 may be, for example, a direct-current (DC) motor, an ultrasonic motor or the like.

(Retention Member 91)

The retention member 91 holds the barrel 5 so that the barrel 5 rotates. The retention member 91 holds the barrel 5 so that the barrel 5 rotates about the rotation axis $A_1$. The retention member 91 holds the barrel 5 so that the barrel 5 rotates about, for example, the optical axis Cp of the light source 1. The retention member 91 holds the barrel 5 so that the barrel 5 rotates about, for example, the optical axis Cc of the light collection optical system 2.

The retention member 91 is held by, for example, the base member 7. The retention member 91 may be, for example, formed integrally with the base member 7. The retention member 91 may be, for example, fixed to the base member 7. The retention member 91 may be, for example, fixed to the base member 7 with screws or the like.

The retention member 91 has, for example, a cylindrical shape. The retention member 91 covers the light source 1. The light source 1 is provided in the retention member 91 having the cylindrical shape. The retention member 91 covers the light collection optical system 2. The light collection optical system 2 is provided in the retention member 91 having the cylindrical shape.

The retention member 91 includes a groove a. The groove a is formed on the +Z-axis direction side of the retention member 91. The groove a is formed at an end on the +Z axis direction side of the retention member 91.

The groove a has a ring shape. The groove a has a circular shape. The ring shape of the groove a is a circular shape. The groove a has, for example, a circular shape about the optical axis Cp of the light source 1. The groove a has, for example, a circular shape about the optical axis Cc of the light collection optical system 2. The optical axis Cp of the light source 1 is, for example, parallel to the Z axis. The optical axis Cc of the light collection optical system 2 is, for example, parallel to the Z axis. The groove a is a continuous groove. The groove a is a continuous groove having a circular shape.

Rolling members 93ab are disposed between the groove a and the groove b. The rolling members 93ab correspond to rolling elements of a rolling bearing. Each of the grooves a and b corresponds to a raceway surface of the rolling bearing.

The barrel 5 rotates with respect to the retention member 91 via the rolling members 93ab. The barrel 5 is held to rotate with respect to the retention member 91 via the rolling members 93ab. The barrel 5 rotates with respect to the retention member 91 about the rotation axis $A_1$ of the wedge prism 3. The barrel 5 is held to rotate with respect to the retention member 91 about the rotation axis $A_1$ of the wedge prism 3. The barrel 5 rotates with respect to the retention member 91 about the optical axis Cp of the light source 1. The barrel 5 is held to rotate with respect to the retention member 91 about the optical axis Cp of the light source 1. The barrel 5 rotates with respect to the retention member 91 about the optical axis Cc of the light collection optical system 2. The barrel 5 is held to rotate with respect to the retention member 91 about the optical axis Cc of the light collection optical system 2.

Alternatively, the barrel 5 can rotate with respect to the retention member 91 via, for example, sliding surfaces without using the rolling members 93ab. That is, the barrel 5 can rotate with respect to the retention member 91 via a bearing structure. The barrel 5 is held to rotate with respect to the retention member 91 via the bearing structure.

(Cover Member 92)

The cover member 92 holds the barrel 6 so that the barrel 6 rotates. The cover member 92 holds the barrel 6 so that the barrel 6 rotates about the rotation axis $A_2$. The cover member 92 holds the barrel 6 so that the barrel 6 rotates about, for example, the optical axis Cp of the light source 1. The cover member 92 holds the barrel 6 so that the barrel 6 rotates about, for example, the optical axis Cc of the light collection optical system 2.

The cover member 92 is held by, for example, the base member 7. The cover member 92 may be held by the retention member 91. The cover member 92 may be fixed to the base member 7 or the retention member 91. For example, the cover member 92 may be fixed to the base member 7 or the retention member 91 with screws or the like.

The cover member 92 has, for example, a cylindrical shape. The cover member 92 covers the light source 1. The light source 1 is provided in the cover member 92 having the cylindrical shape. The cover member 92 covers the light collection optical system 2. The light collection optical system 2 is provided in the cover member 92 having the cylindrical shape. The cover member 92 covers the barrel 5. The barrel 5 is provided in the cover member 92 having the cylindrical shape.

The cover member 92 may be pressed against the base member 7. The cover member 92 may be pressed against the retention member 91. "Pressing" refers to applying force by means of an elastic force of a spring or the like.

For example, the cover member 92 may be pressed against the base member 7 by a spring or the like in the direction of the rotation axis A of the barrels 5 and 6. The cover member 92 may be pressed against the retention member 91 by a spring or the like in the direction of the rotation axis A of the barrels 5 and 6. The rotation axis A is the axis in a case where the rotation axis $A_1$ of the barrel 5 is the same as the rotation axis $A_2$ of the barrel 6. The rotation axis A of the barrels 5 and 6 is, for example, parallel to the Z axis. In this example, the cover member 92 is pressed in the −Z-axis direction.

The cover member 92 includes a receiving surface portion 92a. The receiving surface portion 92a is formed on the +Z-axis direction side of the cover member 92. The receiving surface portion 92a is formed at an end on the +Z-axis direction side of the cover member 92. The receiving surface portion 92a has a plate shape. The receiving surface portion 92a has a ring shape. The receiving surface portion 92a has a plate-like ring shape. The receiving surface portion 92a is formed in parallel to, for example, a plane perpendicular to the Z axis. The receiving surface portion 92a is formed inward from a side surface 92b of the cover member 92.

The cover member 92 includes a groove f. The groove f is formed on the +Z-axis direction side of the cover member 92. The groove f is formed at an end on the +Z-axis direction side of the cover member 92.

The groove f is formed on, for example, a surface on the −Z-axis direction side of the receiving surface portion 92a. The surface on the −Z-axis direction side of the receiving surface portion 92a is an inner surface of the cover member 92.

The groove f has a ring shape. The groove f has a circular shape. The ring shape of the groove f is a circular shape. The groove f has, for example, a circular shape about the optical axis Cp of the light source 1. The groove f has, for example, a circular shape about the optical axis Cc of the light collection optical system 2. The groove f has, for example, a circular shape about the rotation axis $A_2$ of the wedge prism 4. The optical axis Cp of the light source 1 is, for example, parallel to the Z axis. The optical axis Cc of the light collection optical system 2 is, for example, parallel to the Z axis. The rotation axis A of the wedge prism 4 is, for example, parallel to the Z axis. The groove f is a continuous groove. The groove f is a continuous groove having a circular shape.

Rolling members 93ef are disposed between the groove e and the groove f. The rolling members 93ef correspond to rolling elements of a rolling bearing. Each of the grooves e and f corresponds to a raceway surface of the rolling bearing.

The barrel 6 rotates with respect to the cover member 92 via the rolling members 93ef. The barrel 6 is held to rotate with respect to the cover member 92 via the rolling members 93ef. The barrel 6 rotates with respect to the cover member 92 about the rotation axis A of the wedge prism 4. The barrel 6 is held to rotate with respect to the cover member 92 about the rotation axis k of the wedge prism 4. The barrel 6 rotates with respect to the cover member 92 about the optical axis Cp of the light source 1. The barrel 6 is held to rotate with respect to the cover member 92 about the optical axis Cp of the light source 1. The barrel 6 rotates with respect to the cover member 92 about the optical axis Cc of the light collection optical system 2. The barrel 6 is held to rotate with respect to the cover member 92 about the optical axis Cc of the light collection optical system 2.

Alternatively, the barrel 6 can rotate with respect to the cover member 92 via, for example, sliding surfaces without using the rolling members 93ef. That is, the barrel 6 can rotate with respect to the cover member 92 via a bearing structure. The barrel 6 is held to rotate with respect to the cover member 92 via the bearing structure.

For example, in a case where the barrel 6 does not move with respect to the barrel 5 in the direction of the rotation axis $A_2$ using the rolling bearing or the like, one of the base member 91 or the cover member 92 can be eliminated. The same applies to the bearing structure using the sliding surfaces. Examples using the rolling bearing will be described later.

[Structure for Rotating Wedge Prisms 3 and 4]

(Retention Member 91 and Barrel 5)

The retention member 91 and the barrel 5 are disposed with the rolling members 93ab interposed therebetween. The barrel 5 is held by the retention member 91 via the rolling members 93ab. The barrel 5 is held to rotate with respect to the retention member 91. The barrel 5 rotates with respect to the retention member 91 about the rotation axis $A_1$ of the wedge prism 3. The barrel 5 is held to rotate with respect to the retention member 91 about the rotation axis $A_1$ of the wedge prism 3.

For example, the rotation axis $A_1$ of the wedge prism 3 and the optical axis Cp of the light source 1 are the same axis. For example, the rotation axis $A_1$ of the wedge prism 3 and the optical axis Cc of the light collection optical system 2 are the same axis.

The rolling members 93ab are in contact with the groove a and the groove b. The groove a is formed on the retention member 91. The groove b is formed on the barrel 5. The rolling members 93ab roll along the raceway of the groove a and the raceway of the groove b.

The barrel 5 is positioned by the rolling members 93ab with respect to the retention member 91 in the direction of the optical axis Cp of the light source 1. The barrel 5 is positioned by the rolling members 93ab with respect to the retention member 91 in a direction perpendicular to the optical axis Cp of the light source 1. The barrel 5 is positioned by the rolling members 93*ab* with respect to the retention member 91 in the direction of the rotation axis $A_1$ of the wedge prism 3. The barrel 5 is positioned by the rolling members 93*ab* with respect to the retention member 91 in a direction perpendicular to the rotation axis $A_1$ of the wedge prism 3. The barrel 5 is positioned by the rolling members 93*ab* with respect to the retention member 91 in the direction of the optical axis Cc of the light collection optical system 2. The barrel 5 is positioned by the rolling members 93*ab* with respect to the retention member 91 in a direction perpendicular to the optical axis Cc of the light collection optical system 2.

(Barrel 5 and Barrel 6)

The barrel 5 and the barrel 6 are disposed with the rolling members 93*cd* interposed therebetween. The barrel 6 is held by the barrel 5 via the rolling members 93*cd*. The barrel 6 is held to rotate with respect to the barrel 5. The barrel 6 rotates with respect to the barrel 5 about the rotation axis $A_2$ of the wedge prism 4. The barrel 6 is held to rotate about the rotation axis $A_2$ of the wedge prism 4.

For example, the rotation axis $A_2$ of the wedge prism 4 and the optical axis Cp of the light source 1 are the same axis. The rotation axis $A_2$ of the wedge prism 4 and the optical axis Cc of the light collection optical system 2 are, for example, the same axis.

The rotation axis $A_1$ of the barrel 5 and the rotation axis $A_2$ of the barrel 6 are the same axis. The barrel 5 and the barrel 6 rotate about the rotation axes $A_1$ and $A_2$, respectively. The barrel 5 and the barrel 6 are held to rotate about the rotation axes $A_1$ and $A_2$, respectively.

The rolling members 93*cd* are in contact with the groove c and the groove d. The groove c is formed on the barrel 5. The groove d is formed on the barrel 6. The rolling members 93*cd* roll along the raceway of the groove c and the raceway of the groove d.

The barrel 6 is positioned by the rolling members 93*cd* with respect to the barrel 5 in the direction of the rotation axis $A_1$ of the wedge prism 3. The barrel 6 is positioned by the rolling members 93*cd* with respect to the barrel 5 in the direction perpendicular to the rotation axis $A_1$ of the wedge prism 3. The barrel 6 is positioned by the rolling members 93*cd* with respect to the barrel 5 in the direction of the rotation axis $A_2$ of the wedge prism 4. The barrel 6 is positioned by the rolling members 93*cd* with respect to the barrel 5 in a direction perpendicular to the rotation axis A of the wedge prism 4. The barrel 6 is positioned by the rolling members 93*cd* with respect to the barrel 5 in the direction of the optical axis Cp of the light source 1. The barrel 6 is positioned by the rolling members 93*cd* with respect to the barrel 5 in the direction perpendicular to the optical axis Cp of the light source 1. The barrel 6 is positioned by the rolling members 93*cd* with respect to the barrel 5 in the direction of the optical axis Cc of the light collection optical system 2. The barrel 6 is positioned by the rolling members 93*cd* with respect to the barrel 5 in the direction perpendicular to the optical axis Cc of the light collection optical system 2.

(Barrel 6 and Cover Member 92)

The barrel 6 and the cover member 92 are disposed with the rolling members 93*ef* interposed therebetween. The barrel 6 is held by the cover member 92 via the rolling members 93*ef*. The barrel 6 is held to rotate with respect to the cover member 92. The barrel 6 rotates with respect to the cover member 92 about the rotation axis $A_2$ of the wedge prism 4. The barrel 6 is held to rotate with respect to the cover member 92 about the rotation axis $A_2$ of the wedge prism 4.

The rolling members 93*ef* are in contact with the groove e and the groove f. The groove e is formed on the barrel 6. The groove f is formed on the cover member 92. The rolling members 93*ef* roll along the raceway of the groove e and the raceway of the groove f.

The barrel 6 is positioned by the rolling members 93*ef* with respect to the cover member 92 in the direction of the optical axis Cp of the light source 1. The barrel 6 is positioned by the rolling members 93*ef* with respect to the cover member 92 in the direction perpendicular to the optical axis Cp of the light source 1. The barrel 6 is positioned by the rolling members 93*ef* with respect to the cover member 92 in the direction of the rotation axis $A_2$ of the wedge prism 4. The barrel 6 is positioned by the rolling members 93*ef* with respect to the cover member 92 in the direction perpendicular to the rotation axis $A_2$ of the wedge prism 4. The barrel 6 is positioned by the rolling members 93*ef* with respect to the cover member 92 in the direction of the optical axis Cc of the light collection optical system 2. The barrel 6 is positioned by the rolling members 93*ef* with respect to the cover member 92 in the direction perpendicular to the optical axis Cc of the light collection optical system 2.

The cover member 92 and the retention member 91 hold the barrel 5, the barrel 6, and the rolling members 93. The cover member 92 and the retention member 91 hold the barrel 5. The cover member 92 and the retention member 91 hold the barrel 6. The cover member 92 and the retention member 91 hold the rolling members 93. The rolling members 93 are the rolling members 93*ab*, the rolling members 93*cd*, and the rolling members 93*ef*.

The rolling members 93 correspond to, for example, rolling elements of a rolling bearing. The rolling members 93 are, for example, balls (spherical bodies), cylindrical rollers, conical rollers, or the like. Each of the grooves a, b, c, d, e, and f corresponds to, for example, a raceway surface of the rolling bearing. The raceway surface is a surface on which rolling elements of the rolling bearing roll. The raceway is a track on which the rolling elements roll.

[Configurations of Barrels 5 and 6 and Driving Portion 8]

The barrel 5 is disposed on the light source 1 side with respect to the barrel 6. The barrel 5 is disposed on the light source 1 side with respect to the barrel 6 in the direction of the optical axis Cp. The barrel 5 is disposed inside the barrel 6.

The incident opening 53 of the barrel 5 is an opening. The incident opening 53 is an opening through which light emitted from the light source 1 enters the barrel 5. The "opening" refers to a space that is open to the outside. In this example, light emitted from the light source 1 enters the barrel 5 through the incident opening 53. In the case where the light collection optical system 2 is used, light emitted from the light collection optical system 2 enters the barrel 5 through the incident opening 53.

The size of the incident opening 53 is smaller than the size of the wedge prism 3. That is, the diameter of the incident opening 53 is smaller than the diameter of the wedge prism 3. The size in the radial direction of the incident opening 53 is smaller than the size in the radial direction of the wedge prism 3. The size in the radial direction on the inner side of the portion of the barrel 5 on which the gear 51 is formed is smaller than the size in the radial direction on the inner side of the portion of the barrel 5 on which the wedge prism 3 is provided. The size in the radial direction of the portion of the barrel 5 on which the gear 51 is formed is smaller than the size in the radial direction of the portion of the barrel 5 on which the wedge prism 3 is provided.

Light emitted from the light source 1 travels while expanding. Thus, a beam diameter of light passing through the incident opening 53 is smaller than a beam diameter of light incident on the wedge prism 3. The light source 1 is, for example, an LED. Light emitted from the center of a light emission surface of the light source 1 is light parallel to the optical axis Cc of the light collection optical system 2. In contrast, light emitted from an edge portion of the light emission surface of the light source 1 is tilted with respect to the optical axis Cc. Thus, light emitted from the light collection optical system 2 is not completely parallel to the optical axis Cc. Light emitted from the light collection optical system 2 is expanded light.

A distance to the inner side surface of the barrel 5 from a light beam proceeding in the barrel 5 is increased. Accordingly, reflection of light on the inner side surface of the barrel 5 can be suppressed, and stray light can be reduced.

Since the size of the incident opening 53 in the radial direction is small, a pitch circle diameter of the gear 51 can be reduced. That is, reduction of the pitch circle diameter of the gear 51 is facilitated. The pitch circle is a circumference of a cylindrical column when the gear is approximated by the cylindrical column that transmits rotation by rolling friction. The diameter of the pitch circle is referred to as a pitch circle diameter.

The gear 51 is formed on, for example, an outer peripheral portion of the incident opening 53. The gear 51 is formed on, for example, an outer peripheral side of the incident opening 53. Since the pitch circle diameter of the gear 51 can be reduced, the gear 82 can be disposed at a position close to the optical axis Cp of the light source 1. The gear 82 can be disposed at a position close to the rotation axis $A_1$ of the wedge prism 3.

The gear 83 and the gear 82 have the same rotation shaft 87, for example. The rotation shaft of the gear 82 and the rotation shaft of the gear 83 are the same rotation shaft 87. In this case, the gear 83 is disposed at a position close to the optical axis Cp of the light source 1. Since the gear 83 can be disposed at a position close to the optical axis Cp of the light source 1, the pitch circle diameter of the gear 61 can be reduced. The size in the radial direction of the barrel 6 can be reduced. The size in the radial direction on the outer side of the barrel 6 can be reduced. The size in the radial direction of the cylinder portion 63 of the barrel 6 can be reduced. The size in the radial direction on the outer side of the cylinder portion 63 of the barrel 6 can be reduced.

In the first embodiment, the gears 82 and 83 are driven by the motor 81 via the gear 84 and the gear 85. Alternatively, the rotation shaft of the motor 81 can be the same as the rotation shaft 87 of the gears 82 and 83. That is, the gears 82 and 83 can be attached to the rotation shaft of the motor 81. The motor 81 can be easily disposed near the optical axis Cp of the light source 1. The motor 81 can be easily disposed near the rotation axis $A_1$ of the wedge prism 3.

These structures facilitate reducing the size of the illumination device 100.

[Driving of Wedge Prisms 3 and 4 by Driving Portion 8]

A driving operation of the wedge prisms 3 and 4 by the driving portion 8 will be described.

For example, when the motor 81 causes the gear 85 to rotate in the +RZ direction, the gear 84 rotates in the −RZ direction. When the gear 84 rotates in the −RZ direction, the gears 82 and 83 also rotate in the −RZ direction. In the first embodiment, for example, the gears 82, 83, and 84 are integrally formed as the intermediate gears 86.

When the gear 82 rotates in the −RZ direction, the gear 51 rotates in the +RZ direction. Accordingly, the barrel 5 rotates in the +RZ direction. The wedge prism 3 rotates in the +RZ direction.

In contrast, when the gear 83 rotates in the −RZ direction, the gear 61 rotates in the −RZ direction. Accordingly, the barrel 6 rotates in the −RZ direction. The wedge prism 4 rotates in the −RZ direction.

That is, the barrel 5 and the barrel 6 rotate in opposite directions. The rotating direction of the barrel 5 is opposite to the rotating direction of the barrel 6. The wedge prism 3 and the wedge prism 4 rotate in opposite directions. The rotating direction of the wedge prism 3 is opposite to the rotating direction of the wedge prism 4.

For example, a tooth number ratio between the gear 51 and the gear 82 is equal to a tooth number ratio between the gear 61 and the gear 83. The tooth number ratio is also referred to as a gear ratio.

In this case, the barrel 5 and the barrel 6 rotate at the same rotation speed in opposite directions. The wedge prism 3 and the wedge prism 4 rotate at the same rotation speed in opposite directions. With respect to a rotation angle of the motor 81, an absolute value of the rotation angle of the barrel 5 is equal to an absolute value of the rotation angle of the barrel 6. With respect to the rotation angle of the motor 81, an absolute value of the rotation angle of the wedge prism 3 is equal to an absolute value of the rotation angle of the wedge prism 4.

In this case, illumination light emitted from the illumination device 100 moves in such a manner that the illumination light repeatedly follows a trajectory of a straight line, a circle, an oval or the like on an illumination surface.

As illustrated in FIG. 1, for example, an incidence surface 31 of the wedge prism 3 is a surface perpendicular to the rotation axis $A_1$. An emission surface 32 of the wedge prism 3 is a surface tilted with respect a plane perpendicular to the rotation axis $A_1$. Alternatively, the emission surface 32 may be a surface perpendicular to the rotation axis $A_1$, and the incidence surface 31 may be a surface tilted with respect to the plane perpendicular to the rotation axis $A_1$.

As illustrated in FIG. 1, for example, an incidence surface 41 of the wedge prism 4 is a surface tilted with respect to a plane perpendicular to the rotation axis $A_2$. An emission surface 42 of the wedge prism 4 is a surface perpendicular to the rotation axis $A_2$. Alternatively, the incidence surface 41 may be a surface perpendicular to the rotation axis $A_2$, and the emission surface 42 may be a surface tilted with respect to the plane perpendicular to the rotation axis $A_2$.

A state in which the emission surface 32 of the wedge prism 3 is parallel to the incidence surface 41 of the wedge prism 4 is defined as an initial position. A state in which the tilted surface of the wedge prism 3 is parallel to the tilted surface of the wedge prism 4 is defined as an initial position. In this case, wedge angles of the wedge prisms 3 and 4 are equal to each other.

For example, the tooth number ratio between the gear 51 and the gear 82 is equal to the tooth number ratio between the gear 61 and the gear 83. In this case, the barrel 5 and the barrel 6 rotate at the same rotation speed in opposite directions. The wedge prism 3 and the wedge prism 4 rotate at the same rotation speed in opposite directions.

In this case, illumination light emitted from the illumination device 100 draws a linear trajectory on the illumination surface.

As an example, the tooth number ratio between the gear 51 and the gear 82 is different from the tooth number ratio between the gear 61 and the gear 83. In this case, the barrel 5 and the barrel 6 rotate at different rotation speeds in opposite directions. The wedge prism 3 and the wedge prism 4 rotate at different rotation speeds in opposite directions.

In this case, illumination light emitted from the illumination device 100 draws a trajectory of a Lissajous curve on the illumination surface. The Lissajous curve is also referred to as a Lissajous figure. The Lissajous figure is a planar figure obtained by synthesizing two simple harmonic oscillations that oscillate in directions perpendicular to each other.

First Modification

The illumination device 100 can include an image forming portion 21. The illumination device 100 can have a projection function by the image forming portion 21. For example, the illumination device 100 is a projection device that projects image information on a road surface, a passage or the like to attract attention, to guide a passenger, or to perform other functions.

The image information includes a character, a still image and a moving image. The "projection" refers to projecting an image. In the illumination device 100, the light collection optical system 2 projects image information formed by the image forming portion 21 onto a projection plane. The light collection optical system 2 projects an image formed by the image forming portion 21. The light collection optical system 2 is, for example, a projection optical system. The light collection optical system 2 is, for example, a projection lens. The projection plane is, for example, a floor. In the case where the light collection optical system 2 is used for automotive applications, the projection plane is, for example, a road surface.

Accordingly, for example, in the case of guiding a user to a specific place, the illumination device 100 is capable of providing the user with projected image information. With the projected image information, the user can intuitively recognize a direction in which the user is guided.

The image forming portion 21 converts incident light to image light. The image forming portion 21 converts light from the light source 1 to image light. The image light is light having image information. The image forming portion 21 forms an image to be projected.

The illumination device 100 includes the image forming portion 21 configured to form an image between the light source 1 and the light collection optical system 2. The image forming portion 21 is, for example, disposed between the light source 1 and the light collection optical system 2. In this case, light incident on the light collection optical system 2 is image light.

For example, the image forming portion 21 allows a part of the incident light to pass therethrough. The image forming portion 21 blocks a part of the incident light. Accordingly, information of an image to be projected is formed on the image forming portion 21.

The image forming portion 21 includes, for example, a liquid crystal device. The liquid crystal device is also referred to as a liquid crystal panel or a liquid crystal light valve. The liquid crystal panel forms an image by allowing a part of light or blocking a part of light using a polarizing filter. For example, an image signal (image information) is input to the image forming portion 21. The image forming portion 21 then forms an image based on the image signal. The liquid crystal panel is capable of changing image information to be projected in accordance with input image information. With the liquid crystal panel, the projected image information can be a moving image.

The image forming portion 21 includes, for example, a light-shielding plate. The image forming portion 21 can employ, for example, a light-shielding plate or a light-shielding film. The light-shielding plate includes a light-shielding film. The light-shielding plate forms image information by a transmission region and a light-shielding region.

The light-shielding plate is, for example, a plate of a metal such as stainless steel. The light-shielding film is, for example, a film obtained by applying chromium, aluminum or the like onto a base material such as glass.

The light-shielding plate or the light-shielding film cannot change image information to be projected. In the case where the light-shielding plate or the light-shielding film is employed, the image forming portion 21 projects a single type of image information. The image forming portion 21 is capable of projecting a plurality of types of image information by changing the light-shielding plate or the light-shielding film. For example, the light-shielding plate or the light-shielding film may be configured as a rotation plate. By rotating the light-shielding plate or the light-shielding film, a plurality of types of image information can be projected.

The image forming portion 21 includes, for example, a micromirror display or the like. The micromirror display includes, for example, a plurality of micromirrors arranged in two dimensions. The image forming portion 21 can employ, for example, a display device using a plurality of micromirrors.

The display device using the plurality of micromirrors is, for example, a display device using minute reflective mirrors. The display device using micromirrors is, for example, a digital light processing (DLP: registered trademark), a digital micromirror device (DMD: registered trademark) or the like using a micro electro mechanical system (MEMS) technique.

The "MEMS" is a device or a system in which minute electric components and mechanical components are assembled on one board. The display device using micromirrors can change image information to be projected. With the display device using micromirrors, the projected image information can be a moving image.

Image information is formed by the image forming portion 21. The light collection optical system 2 enlarges an image formed by the image forming portion 21 and projects the image. At this time, the image information is obtained by enlarging an image formed by the image forming portion 21. The image information is an image which is formed by the image forming portion 21 and then projected while inverting the image in the vertical direction and in the lateral direction.

Second Modification

Figure 3:
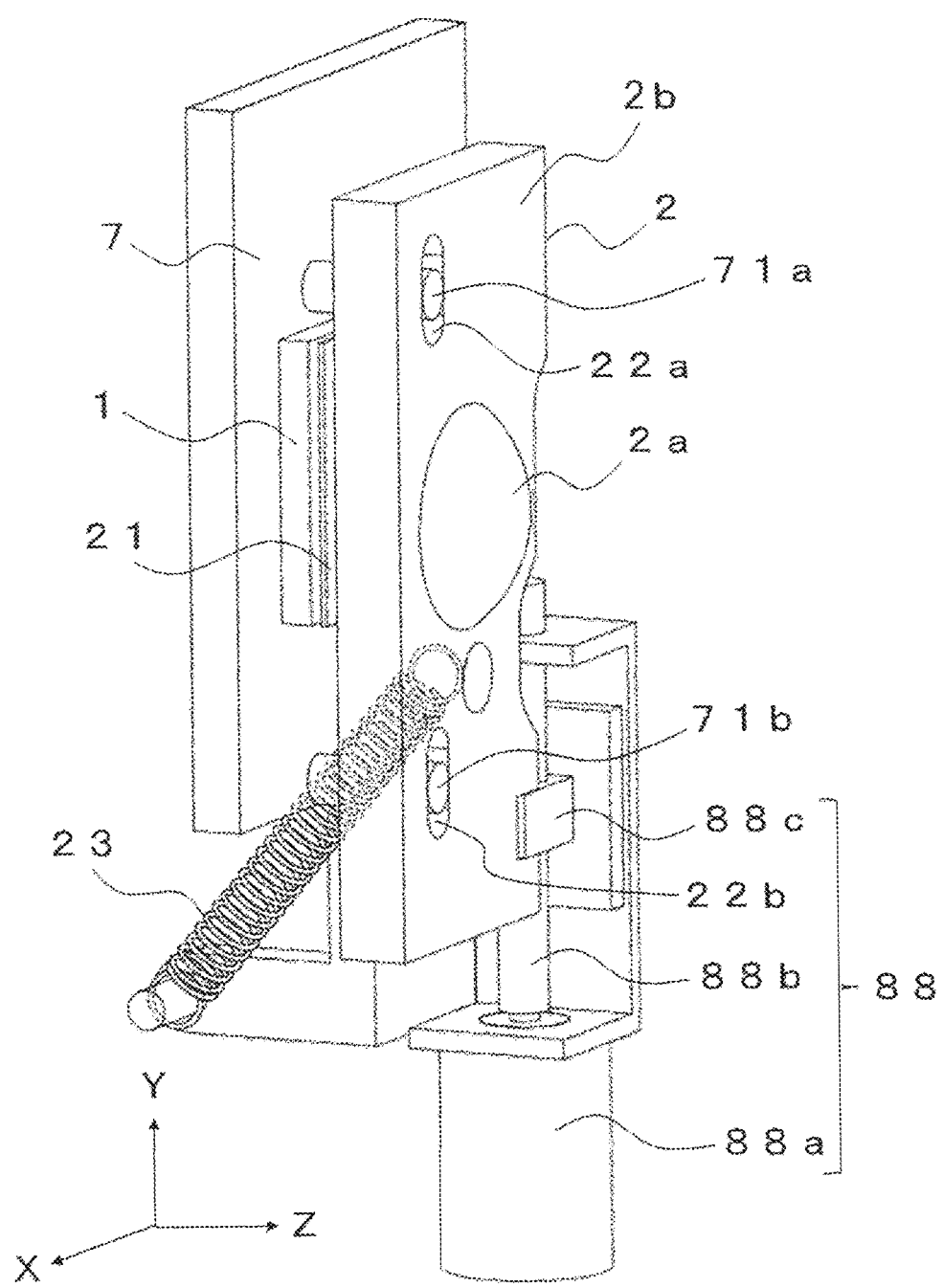
FIG. 3 is a perspective view of a portion of a light collection optical system 2 of an illumination device 100 according to a second modification.

FIG. 3 is a perspective view of a portion of the light collection optical system 2. In this modification, the light collection optical system 2 moves in a direction perpendicular to the optical axis Cc of the light collection optical system 2. The light collection optical system 2 is held to move in the direction perpendicular to the optical axis Cc of the light collection optical system 2.

The light collection optical system 2 is, for example, a lens. The light collection optical system 2 includes a lens portion 2a and a plate portion 2b.

The plate portion 2b has holes 22. The holes 22 guide the light collection optical system 2 in a moving direction. In FIG. 3, the moving direction of the light collection optical system 2 is the Y-axis direction. In the Y-axis direction, two holes 22a and 22b are formed. Each of the holes 22a and 22b is a slot elongated in the Y-axis direction. Each of the holes 22a and 22b is a slot elongated in the moving direction of the light collection optical system 2.

The light collection optical system 2 is pressed by, for example, an elastic body 23. The light collection optical system 2 is pressed by the elastic body 23 so that the light collection optical system 2 is brought into contact with the base member 7. The light collection optical system 2 is pressed against the base member 7 by the elastic body 23. The elastic body 23 is for example, a spring, a rubber or the like.

In FIG. 3, the elastic body 23 is a tension coil spring. In FIG. 3, the elastic body 23 pulls the light collection optical system 2 in the −Z-axis direction and the −Y-axis direction. As the elastic body 23 pulls the light collection optical system 2 in the −Z-axis direction, the light collection optical system 2 is pressed against the base member 7. As the elastic body 23 pulls the light collection optical system 2 in the −Y-axis direction, a backlash between a feed screw 88b and a nut 88c described later is reduced.

The base member 7 includes pins 71. The base member 7 includes, for example, two pins 71a and 71b. The two pins 71a and 71b are provided on a surface on the +Z-axis direction side of the base member 7. The pins 71 are inserted in the holes 22. The pin 71a is inserted in the hole 22a. The pin 71b is inserted in the hole 22b. The light collection optical system 2 moves while being guided by the pins 71. The light collection optical system 2 moves in the direction perpendicular to the optical axis Cc while being guided by the pins 71.

A feed mechanism 88 moves the light collection optical system 2. The feed mechanism 88 moves the light collection optical system 2 in the direction perpendicular to the optical axis Cc.

The feed mechanism 88 includes, for example, a motor 88a, the feed screw 88b, and the nut 88c. The motor 88a causes the feed screw 88b to rotate. The feed screw 88b is attached to, for example, a shaft of the motor 88a. The nut 88c is mounted to the feed screw 88b. The nut 88c meshes with the feed screw 88b. Rotation of the feed screw 88b causes the nut 88c to move in the axial direction of the feed screw 88b.

The nut 88c is in contact with the light collection optical system 2 at a surface on the −Y-axis direction side, for example. The elastic body 23 pulls the light collection optical system 2 in the −Y-axis direction. Accordingly, the nut 88c holds the light collection optical system 2 resisting a force of the elastic body 23. The nut 88c positions the light collection optical system 2 in the Y-axis direction. Accordingly, when the motor 88a rotates, the light collection optical system 2 moves in the axial direction of the feed screw 88b via the nut 88c. The axial direction of the feed screw 88b is the Y-axis direction.

The wedge prisms 3 and 4 deflect light emitted from the light source 1 in a linear direction. For example, the wedge prisms 3 and 4 deflect light emitted from the light source 1 linearly in the X-axis direction. The light collection optical system 2 moves in the Y-axis direction with respect to the light source 1. Accordingly, light emitted from the wedge prisms 3 and 4 is deflected in the Y-axis direction. The illumination device 100 deflects projected light in two axial directions. The two axial directions are, for example, directions perpendicular to the optical axis Cc. The illumination device 100 moves projected light in a plane on the illumination surface.

The configuration for holding the light collection optical system 2 so as to allow movement of the light collection optical system 2 is not limited to the configuration described above. For example, the configuration may include a linear guide rail, a link mechanism, or the like. The configuration may include a mechanism using a rack and a pinion.

For example, when pins with heads are used in place of the pins 71a and 71b, the elastic body 23 can be eliminated. Movement of the lens portion 2a in the direction of the optical axis Cc can be reduced by reducing a gap between the head of each pin and the plate portion 2b.

Third Modification

Figure 4:
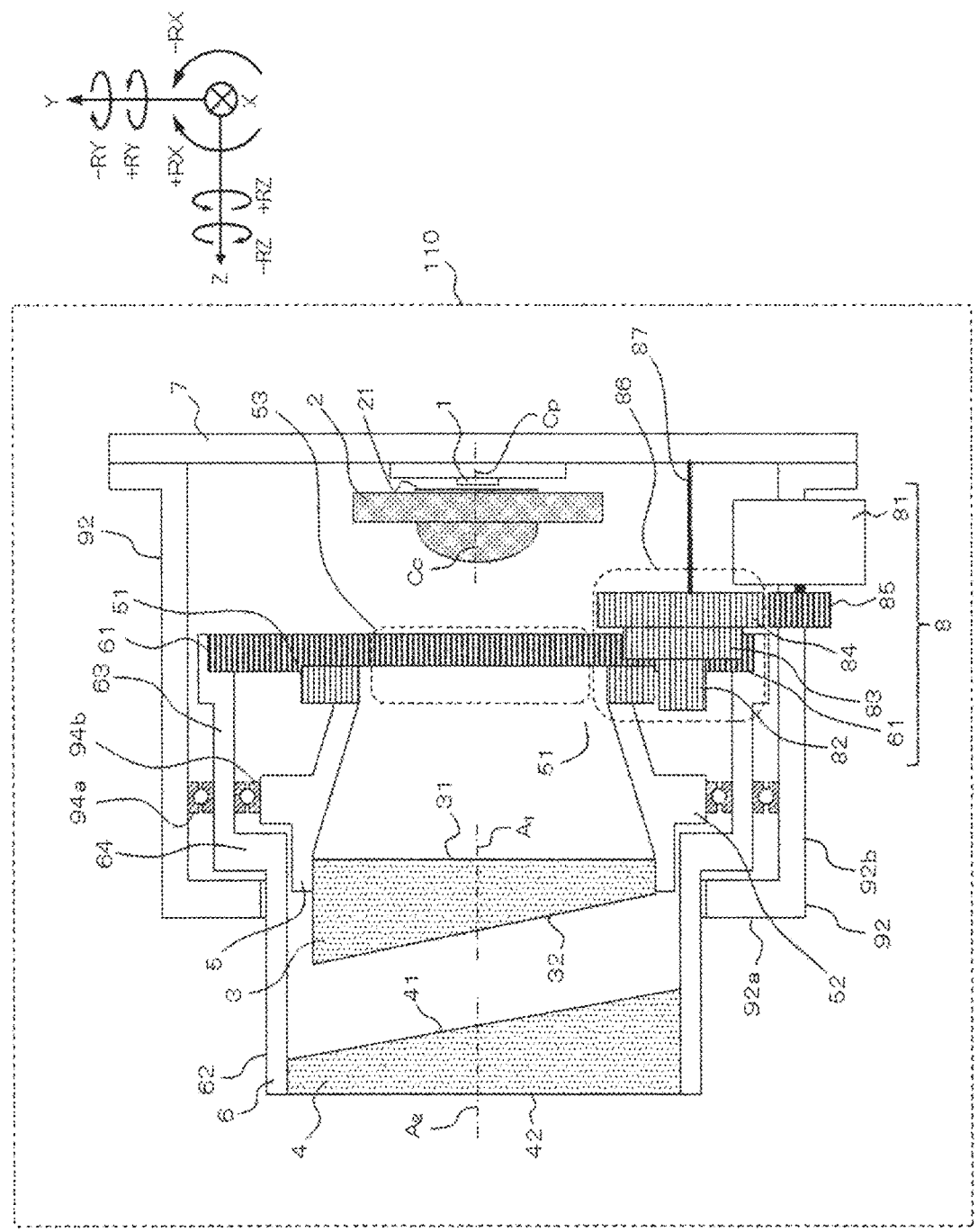
FIG. 4 is a configuration diagram of an illumination device 110 according to a third modification.
Figure 5:
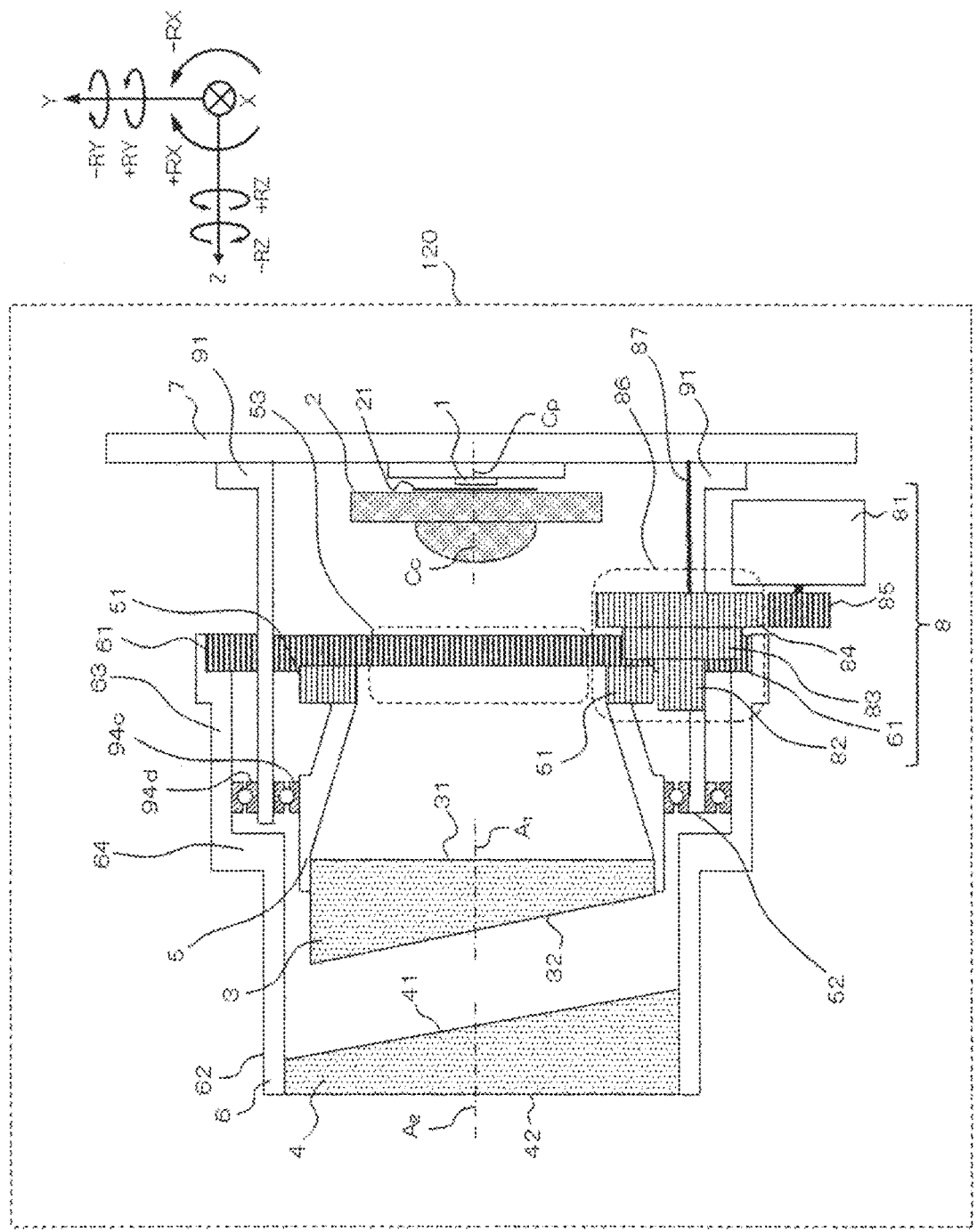
FIG. 5 is a configuration diagram of an illumination device 120 according to the third modification.

FIG. 4 is a configuration diagram of an illumination device 110 according to a third modification. FIG. 5 is a configuration diagram of an illumination device 120 according to the third modification. Components which are similar to those of the illumination device 100 are assigned with the same reference characters, and description thereof will be omitted.

The illumination device 110 uses rolling bearings 94 instead of the rolling members 93. The rolling bearings 94 include a rolling bearing 94a and a rolling bearing 94b. The illumination device 110 includes no retention member 91. That is, in the illumination device 110, the retention member 91 can be eliminated.

The rolling bearing 94a is disposed between the barrel 6 and the cover member 92. Thus, the barrel 6 rotates with respect to the cover member 92 via the rolling bearing 94a. The barrel 6 is held to rotate with respect to the cover member 92 via the rolling bearing 94a. The barrel 6 rotates with respect to the cover member 92 about the rotation axis $A_2$ of the wedge prism 4. The barrel 6 rotates with respect to the cover member 92 about the rotation axis $A_2$ of the wedge prism 4. The cover member 92 holds the barrel 6 so that the barrel 6 rotates about the rotation axis $A_2$ of the barrel 6.

The illumination device 110 illustrated in FIG. 4 includes one rolling bearing 94a. Alternatively, two rolling bearings 94a may be disposed side by side in the direction of the rotation axis $A_2$. With this arrangement, a tilt of the rotation axis $A_2$ with respect to the optical axis Cp of the light source 1 can be reduced. A tilt of the rotation axis $A_2$ with respect to the optical axis Cc of the light collection optical system 2 can be reduced.

The rolling bearing 94b is disposed between the barrel 5 and the barrel 6. Thus, the barrel 5 rotates with respect to the barrel 6 via the rolling bearing 94b. The barrel 5 is held to rotate with respect to the barrel 6 via the rolling bearing 94b. The barrel 5 rotates with respect to the barrel 6 about the rotation axis $A_1$ of the wedge prism 3. The barrel 5 is held to rotate with respect to the barrel 6 about the rotation axis $A_1$ of the wedge prism 3. The barrel 6 holds the barrel 5 so that the barrel 5 rotates about the rotation axis $A_1$ of the barrel 5.

The illumination device 110 illustrated in FIG. 4 includes one rolling bearing 94b. Alternatively, two rolling bearings 94b may be disposed side by side in the direction of the rotation axis $A_1$. With this arrangement, a tilt of the rotation axis $A_1$ with respect to the rotation axis $A_2$ can be reduced. A tilt of the rotation axis $A_1$ with respect to the optical axis Cp of the light source 1 can be reduced. A tilt of the rotation axis $A_1$ with respect to the optical axis Cc of the light collection optical system 2 can be reduced.

As shown in FIG. 5, the illumination device 120 uses rolling bearings 94 in place of the rolling members 93. The rolling bearings 94 include a rolling bearing 94c and a rolling bearing 94d. The illumination device 120 includes no cover member 92. That is, in the illumination device 120, the cover member 92 can be eliminated.

The rolling bearing 94c is disposed between the barrel 5 and the retention member 91. Thus, the barrel 5 rotates with respect to the retention member 91 via the rolling bearing 94c. The barrel 5 is held to rotate about the retention member 91 via the rolling bearing 94c. The barrel 5 rotates with respect to the retention member 91 about the rotation axis $A_1$ of the wedge prism 3. The barrel 5 is held to rotate with respect to the retention member 91 about the rotation axis $A_1$ of the wedge prism 3. The retention member 91 holds the barrel 5 so that the barrel 5 rotates about the rotation axis $A_1$ of the barrel 5.

The illumination device 120 illustrated in FIG. 5 includes one rolling bearing 94c. Alternatively, two rolling bearings 94c may be disposed side by side in the direction of the rotation axis $A_1$. With this arrangement, a tilt of the rotation axis $A_1$ with respect to the optical axis Cp of the light source 1 can be reduced. A tilt of the rotation axis $A_1$ with respect to the optical axis Cc of the light collection optical system 2 can be reduced.

The rolling bearing 94d is disposed between the barrel 6 and the retention member 91. Thus, the barrel 6 rotates with respect to the retention member 91 via the rolling bearing 94d. The barrel 6 is held to rotate with respect to the retention member 91 via the rolling bearing 94d. The barrel 6 rotates with respect to the retention member 91 about the rotation axis $A_2$ of the wedge prism 4. The barrel 6 is held to rotate with respect to the retention member 91 about the rotation axis $A_2$ of the wedge prism 4. The retention member 91 holds the barrel 6 so that the barrel 6 rotates about the rotation axis k of the barrel 6.

The illumination device 120 illustrated in FIG. 5 includes one rolling bearing 94d. Alternatively, two rolling bearings 94d may be disposed side by side in the direction of the rotation axis $A_2$. Thus, a tilt of the rotation axis $A_2$ with respect to the optical axis Cp of the light source 1 can be reduced. A tilt of the rotation axis $A_2$ with respect to the optical axis Cc of the light collection optical system 2 can be reduced. A tilt of the rotation axis $A_2$ with respect to the rotation axis $A_1$ can be reduced by using the two rolling bearings 94c and the two rolling bearings 94d.

In the illumination device 120, a tilt of the rotation axis $A_1$ with respect to the optical axis Cp of the light source 1 can be reduced more than in the illumination device 110. In the illumination device 120, a tilt of the rotation axis $A_1$ with respect to the optical axis Cc of the light collection optical system 2 can be reduced more than in the illumination device 110.

In the above describe embodiment, terms such as "parallel" or "perpendicular" indicating the positional relationships among components, and terms indicating the shapes of the components are used. These terms include ranges in which manufacturing tolerances, assembly variations or the like are taken into consideration. Thus, recitations in the claims indicating the positional relationships among components or the shapes of components include ranges in which manufacturing tolerances, assembly variations or the like are taken into consideration.

Although the embodiment of the present invention has been described, the invention is not limited to the embodiment.

Based on the above described embodiment, the subject matter of the invention will be de described as appendixes as follows.

Appendix 1
An illumination device comprising:
a light source to emit light;
a pair of wedge prisms to receive the light and deflect the received light; and
a driving portion including a first gear and a second gear, and causing the pair of wedge prisms to rotate about a first rotation axis of the pair of wedge prisms by using the first gear and the second gear,
wherein the pair of wedge prisms include a first wedge prism held by a first barrel and a second wedge prism held by a second barrel;
wherein the first barrel is disposed inside the second barrel;
wherein a third gear whose center axis is the first rotation axis is provided on an outer periphery of the first barrel;
wherein a fourth gear whose center axis is the first rotation axis is provided on an inner periphery of the second barrel;
wherein the first gear is disposed on an outer peripheral side of the third gear and meshes with the third gear; and
wherein the second gear is disposed on an inner peripheral side of the fourth gear and meshes with the fourth gear.

Appendix 2
The illumination device of Appendix 1, wherein the light emitted from the light source is incident on the first wedge prism, and
wherein the light emitted from the first wedge prism is incident on the second wedge prism.

Appendix 3
The illumination device of Appendix 1 or 2, wherein the light source emits light having a divergence angle.

Appendix 4
The illumination device of any one of Appendixes 1 to 3, wherein the third gear is formed at an end on the light source side of the first barrel.

Appendix 5
The illumination device of any one of Appendixes 1 to 4, wherein a size in the radial direction of a portion of the first barrel on which the third gear is formed is smaller than a size in the radial direction of a portion of the first barrel on which the first wedge prism is provided.

Appendix 6
The illumination device of any one of Appendixes 1 to 5, wherein the first gear and the second gear are disposed between the light source and the first wedge prism in a direction of an optical axis of the light source.

Appendix 7
The illumination device of any one of Appendixes 1 to 6, wherein the second gear is disposed between the light source and the first barrel in a direction of an optical axis of the light source.

Appendix 8
The illumination device of any one of Appendixes 1 to 7, wherein the first gear is disposed on the first wedge prism side with respect to the second gear in a direction of the first rotation axis.

Appendix 9
The illumination device of any one of Appendixes 1 to 8, wherein a rotation shaft of the first gear and a rotation shaft of the second gear are the same rotation shaft which is a second rotation shaft.

Appendix 10
The illumination device of Appendix 9, wherein the driving portion includes one motor, and
wherein the motor causes the second rotation shaft to rotate.

Appendix 11

The illumination device of any one of Appendixes 1 to 10, comprising a light collection optical system to change a divergence angle of the light emitted from the light source.

Appendix 12

The illumination device of Appendix 11, wherein the first gear and the second gear are disposed between the light collection optical system and the first wedge prism in a direction of an optical axis of the light collection optical system.

Appendix 13

The illumination device of Appendix 11 or 12, wherein the second gear is disposed between the light collection optical system and the first barrel in the direction of the optical axis of the light collection optical system.

Appendix 14

The illumination device of any one of Appendixes 11 to 13, wherein the light collection optical system is held to move in a direction perpendicular to an optical axis of the light collection optical system.

Appendix 15

The illumination device of any one of Appendixes 11 to 14, comprising an image forming portion disposed between the light source and the light collection optical system, and wherein the light collection optical system projects an image formed by the image forming portion.

Appendix 16

The illumination device of any one of Appendixes 1 to 15, wherein the second barrel is held to rotate with respect to the first barrel via a bearing structure.

DESCRIPTION OF REFERENCE CHARACTERS 100, 110, 120 illumination device; 1 light source; 2 light collection optical system; 2a lens portion; 2b plate portion; 21 image forming portion; 22, 22a, 22b hole; 23 elastic body; 3, 4 wedge prism; 31, 41 incidence surface; 32, 42 emission surface; 5, 6 barrel; 51, 61 gear; 52 projection; 53 incident opening; 62, 63 cylinder portion; 64 joint portion; 7 base member; 71, 71a, 71b pin; 8 driving portion; 81 motor; 82, 83, 84, 85 gear; 86 intermediate gear; 88 feed mechanism; 88a motor; 88b feed screw; 88c nut; 91 retention member; 92 cover member; 92a receiving surface portion; 92b side surface; 93, 93ab, 93cd, 93ef rolling member; 94, 94a, 94b, 94c, 94d rolling bearing; a, b, c, d, e, f groove; A, $A_1$, kA rotation axis; Cp, Cc optical axis.

What is claimed is:

1. An illumination device comprising:
a light source to emit light;
a pair of wedge prisms to receive the light and deflect the received light; and
a driving portion including a first gear and a second gear, the driving portion causing the pair of wedge prisms to rotate about a first rotation axis of the pair of wedge prisms by using the first gear and the second gear,
wherein the pair of wedge prisms include a first wedge prism held by a first barrel and a second wedge prism held by a second barrel;
wherein the first barrel is disposed inside the second barrel;
wherein a third gear whose center axis is the first rotation axis is provided on an outer periphery of the first barrel;
wherein a fourth gear whose center axis is the first rotation axis is provided on an inner periphery of the second barrel;
wherein the first gear is disposed on an outer peripheral side of the third gear and meshes with the third gear; and
wherein the second gear is disposed on an inner peripheral side of the fourth gear and meshes with the fourth gear.

2. The illumination device according to claim 1, wherein the light emitted from the light source is incident on the first wedge prism, and
wherein the light emitted from the first wedge prism is incident on the second wedge prism.

3. The illumination device according to claim 1, wherein the third gear is formed at an end on the light source side of the first barrel.

4. The illumination device according to claim 1, wherein a size in the radial direction of a portion of the first barrel on which the third gear is formed is smaller than a size in the radial direction of a portion of the first barrel on which the first wedge prism is provided.

5. The illumination device according to claim 1, wherein the first gear and the second gear are disposed between the light source and the first wedge prism in a direction of an optical axis of the light source.

6. The illumination device according to claim 1, wherein the second gear is disposed between the light source and the first barrel in a direction of an optical axis of the light source.

7. The illumination device according to claim 1, wherein the first gear is disposed on the first wedge prism side with respect to the second gear in a direction of the first rotation axis.

8. The illumination device according to claim 1, comprising a light collection optical system to change a divergence angle of the light emitted from the light source.

9. The illumination device according to claim 8, wherein the light collection optical system is held to move in a direction perpendicular to an optical axis of the light collection optical system.

10. The illumination device according to claim 8, comprising an image forming portion provided between the light source and the light collection optical system, the image forming portion forming an image,
wherein the light collection optical system projects the image formed by the image forming portion.

* * * * *